United States Patent
Yoo

(10) Patent No.: US 7,269,446 B2
(45) Date of Patent: Sep. 11, 2007

(54) HANDS-FREE SIGNAL PROCESSING DEVICE IN A MOBILE COMMUNICATION TERMINAL

(75) Inventor: Jong Won Yoo, Gunpo-Si (KR)

(73) Assignee: Curitel Communications, Inc., Kyungki-Do (KR)

( * ) Notice: Subject to any disclaimer, the term of this patent is extended or adjusted under 35 U.S.C. 154(b) by 312 days.

(21) Appl. No.: 10/973,906

(22) Filed: Oct. 26, 2004

(65) Prior Publication Data

US 2005/0096097 A1 May 5, 2005

(30) Foreign Application Priority Data

Oct. 29, 2003 (KR) ...................... 10-2003-0075924

(51) Int. Cl.
*H04M 1/00* (2006.01)

(52) U.S. Cl. ............................... 455/569.1; 455/575.2; 381/74; 381/375

(58) Field of Classification Search ............ 455/550.1, 455/569.1, 568, 569, 575.1, 575.2; 381/74, 381/91, 92, 110, 111, 122, 361, 375, 370, 381/374

See application file for complete search history.

(56) References Cited

U.S. PATENT DOCUMENTS

| | | | | |
|---|---|---|---|---|
| 3,766,318 | A * | 10/1973 | Webb ........................ | 381/70 |
| 6,058,319 | A * | 5/2000 | Sadler ...................... | 455/569.2 |
| 6,122,369 | A * | 9/2000 | Hwang et al. ......... | 379/420.04 |
| 6,397,087 | B1 * | 5/2002 | Kim et al. ............... | 455/569.1 |
| 2004/0116159 | A1 * | 6/2004 | Cheng ..................... | 455/569.1 |

* cited by examiner

*Primary Examiner*—Edward F. Urban
*Assistant Examiner*—Nhan T. Le
(74) *Attorney, Agent, or Firm*—Ohlandt, Greeley, Ruggiero & Perle L.L.P.

(57) ABSTRACT

Disclosed is a hands-free signal processing device in a mobile communication terminal. More particularly, disclosed is a hands-free signal processing device in a mobile communication terminal, which may separate hands-free signals, such as a microphone signal and an interrupt signal generated in a hands-free device, by using transistors, and properly process the hands-free signals.

According to the present invention, current consumption caused by a hands-free device can be minimized by converting AUX_MIC signal into pulse and by using the pulse as a reference pulse of the hands-free device.

Further, a talk-key interrupt signal of a hands-free device can be correctly detected while incoming/outgoing calls are connected. Thus, a problem in timing can be solved and a proper reaction to the talk-key interrupt signal of a hands-free device can be achieved.

4 Claims, 4 Drawing Sheets

(a)

(b)

(c)

HANDS-FREE SIGNAL PROCESSING DEVICE IN A MOBILE COMMUNICATION TERMINAL

CROSS-REFERENCE TO RELATED APPLICATION

The entire disclosure of Korean Patent Application No. 10-2003-0075924 filed on Oct. 29, 2003 including specification, claims, drawings and summary, is incorporated herein by reference in its entirety.

BACKGROUND OF THE INVENTION

1. Field of the Invention

The present invention relates to a hands-free signal processing device in a mobile communication terminal. More particularly, the present invention relates to a hands-free signal processing device in a mobile communication terminal, which may separate hands-free signals, such as a microphone (MIC) signal and an interrupt signal generated in a hands-free device, by using transistors, and properly process the hands-free signals.

2. Description of the Related Art

As distribution of mobile communication terminals such as a celluar phone, an internet phone, IMT-2000 terminal and PDA phone rapidly increases due to development of communication technology, accessories and various supplementary items for such mobile communication terminals are also being developed. One of the accessories and various supplementary items is a hands-free device.

The hands-free device has a lot of shapes and a representative device is an earphone type hands-free device having a function of microphone.

As illustrated in FIG. 1, the earphone type hands-free device comprises an ear-jack 11 for connecting the hands-free device to mobile communication terminals and an earphone 12 for receiving sounds, the ear-jack 11 being an end of the hands-free device, the earphone 12 being another end of the hands-free device. The hands-free device further comprises a microphone 14 for transferring a voice and a talk-key 15 for connecting and disconnecting calls between the ear-jack 11 and the earphone 12. The hands-free device further comprises an earphone wire 13 having a signal line for communicating with mobile communication terminals, the earphone wire 13 connecting the ear-jack 11, the earphone 12, the microphone 14 and the talk-key 15.

In a hands-free device for mobile communication terminals in the related art, an audio signal from the microphone 14 and an interrupt signal generated by pressing the talk-key 15 have the same pattern and the signals transferred through one signal line. Thus, there is a problem in timing that a bug preventing a relevant reaction to the press of a talk-key of a hands-free device could happen. Besides, current consumption is badly increased by using a high level as reference timing.

BRIEF SUMMARY OF THE INVENTION

It is an object of the present invention to minimize current consumption due to hands-free device by converting AUX_MIC signal to pulse signal and using the pulse signal as reference pulse of the hands-free device.

It is another object of the present invention to precisely detect interrupt signal while outgoing/incoming calls are connected, by separating microphone signal and interrupt signal through using transistors and by making base-band processor deal with the microphone signal and the interrupt signal. Accordingly, problems in timing can be solved and a proper reaction to the interrupt signal of the hands-free device can be achieved.

In order to accomplish the objects, there is provided a hands-free signal processing device in a mobile communication terminal comprising: a signal separating transistor, connected to a microphone (MIC) terminal of an ear-jack provided in a hands-free device and a base-band processor for processing a talk-key interrupt signal of the hands-free device, for separating a MIC signal and the talk-key interrupt signal; and a pulse providing transistor, connected to the MIC terminal of the ear-jack and general purpose output (GPO) port of the base-band processor, for providing the signal separating transistor with the MIC signal varying according to output signal from the GPO port.

Preferably, the signal separating transistor may be an NPN transistor with an emitter terminal tied to ground, a base terminal of the signal separating transistor being connected to the MIC terminal of the ear-jack, a collector terminal of the signal separating transistor being connected to an interrupt port of the base-band processor.

Preferably, the pulse providing transistor may be an NPN transistor with an emitter terminal tied to ground, an emitter terminal of the pulse providing transistor being connected to the MIC terminal of the ear-jack, a base terminal of the pulse providing transistor being connected to the GPO port of the base-band processor.

Preferably, the base-band processor may disable the signal separating transistor by outputting the software-processed pulse through the GPO port and providing the base terminal of the signal separating transistor with the pulse through the pulse providing transistor, when the mobile communication terminal is in an idle state.

Preferably, the base-band processor may enable the signal separating transistor by changing output pulse from the GPO port to a high-level signal using software and using the high-level signal as reference pulse of the hands-free device, while outgoing/incoming calls are connected.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

The exemplary embodiments of the present invention are described in detail with reference to the attached drawings in the following.

According to the present invention, an AUX_MIC signal is converted to a pulse signal, which is used as the reference pulse of a hands-free device, using transistors when a mobile communication terminal is in an idle state. Further, a talk-key interrupt signal is detected by converting a reference pulse to a high-level signal, while incoming/outgoing calls are connected. Furthermore, in a mobile communication terminal, a microphone signal and a talk-key interrupt signal of a hands-free device are separated using transistors and the signals are processed by a base-band processor respectively.

Figure 1:
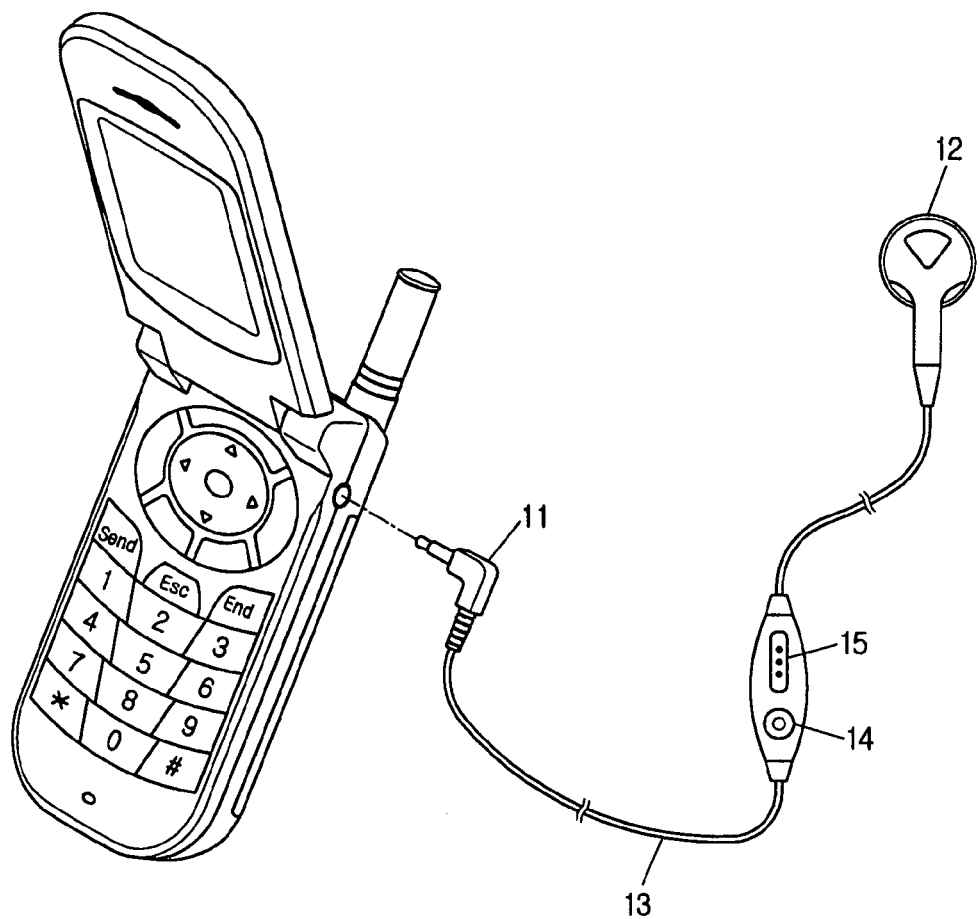
FIG. 1 shows a hands-free device for a mobile communication terminal in the related art.
Figure 2:
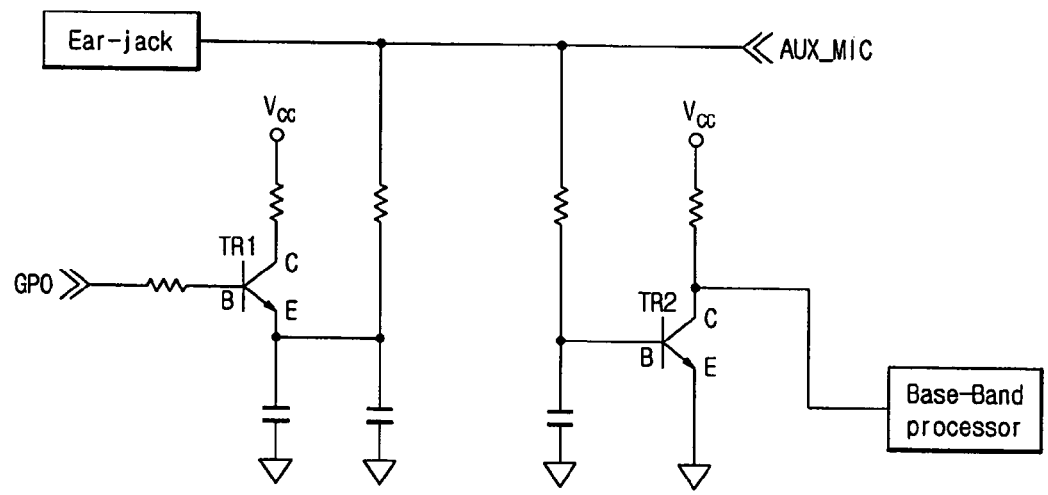
FIG. 2 is a circuit diagram showing a hands-free signal processing device in a mobile communication terminal according to the present invention.

FIG. 2 illustrates a hands-free signal processing device in a mobile communication terminal according to the present invention.

A hands-free device is provided with output signal from GPO port of a base-band processor as a reference pulse by connecting a pulse providing transistor (TR1) to AUX_MIC terminal of an ear-jack provided in one end of the hands-free device. The TR1 is an NPN transistor with an emitter terminal tied to ground. The emitter terminal of the TR1 is connected to the AUX_MIC terminal of the ear-jack and a base terminal of the TR1 is connected to the GPO port of the base-band processor. Further, a collector terminal of the TR1 is connected to Vcc. The TR1 is enabled by using software-processed pulse as reference timing.

Accordingly, in the idle state of a mobile communication terminal, the TR1 converts an AUX_MIC signal to pulse signal and the pulse is provided to the hands-free device as a reference pulse, thereby reducing current consumption.

And, a signal separating transistor (TR2) is connected to the AUX_MIC terminal of the ear-jack to separate a microphone (MIC) signal and a talk-key interrupt signal of hands-free device, in the mobile communication terminal. The TR2 is an NPN transistor with an emitter terminal tied to ground. A base terminal of the TR2 is connected to the AUX-MIC terminal of the ear-jack, and a collector terminal of the TR2 is connected to an interrupt port of the base-band processor for processing hands-free signal, i.e. the MIC signal and a talk-key interrupt signal. The collector terminal of the TR2 is also connected to Vcc.

The TR2 is enabled by changing output signal from the GPO port of the base-band processor into a high-level signal using software and using the high-level signal as a reference pulse of the hands-free device while incoming/outgoing calls are connected. The talk-key interrupt signal can be detected due to the enabled TR2.

Figure 3:
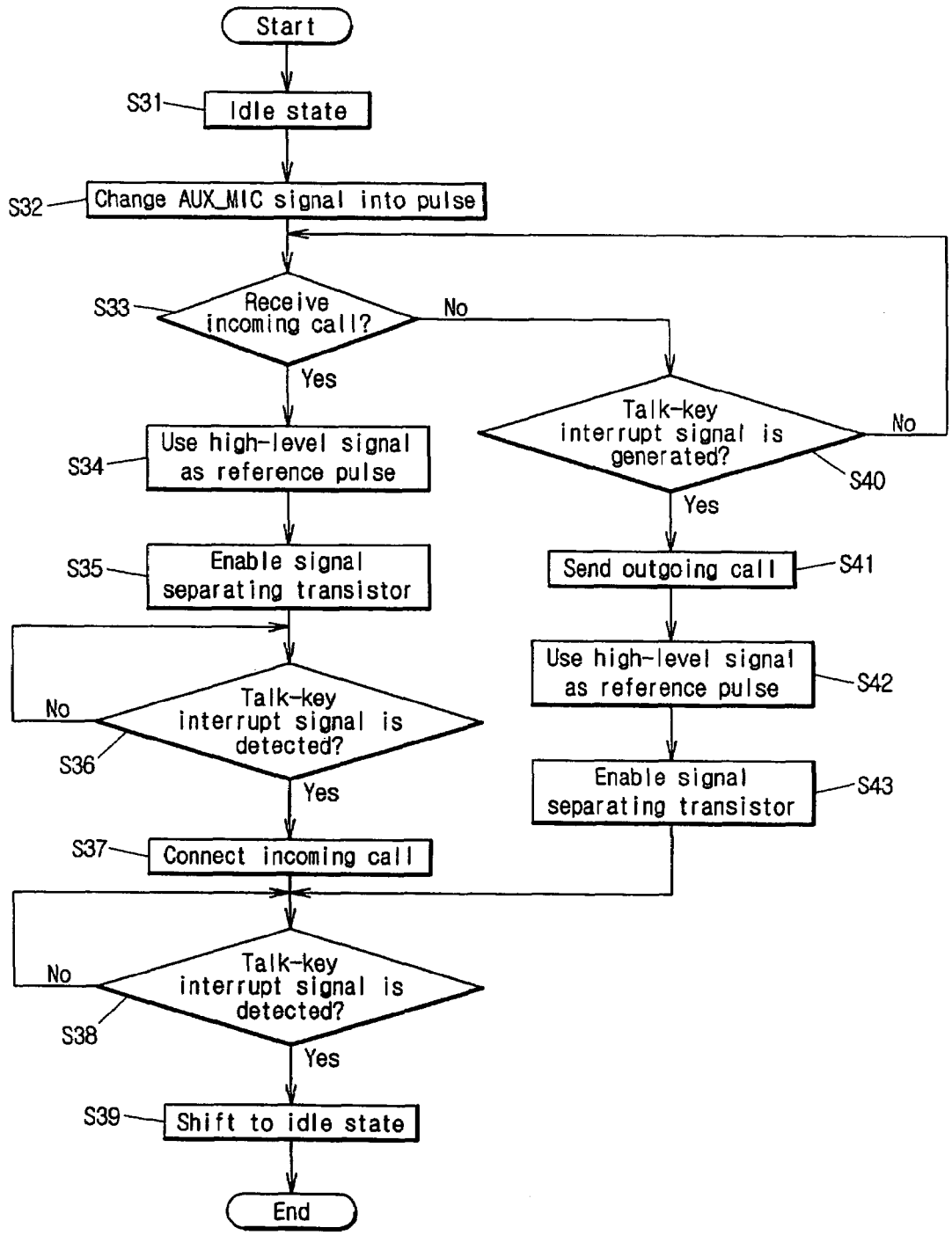
FIG. 3 shows operations of hands-free signal processing device in a mobile communication terminal according to the present invention.
Figure 4:
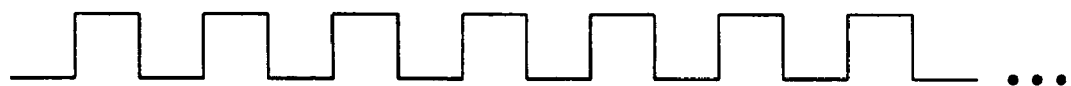
FIG. 4 is a timing diagram showing operations of hands-free signal processing device in a mobile communication terminal according to the present invention.
Figure 4:
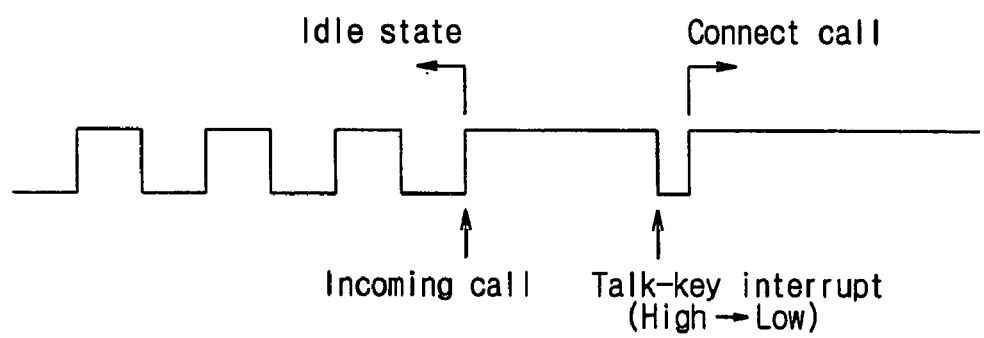
Figure 4:
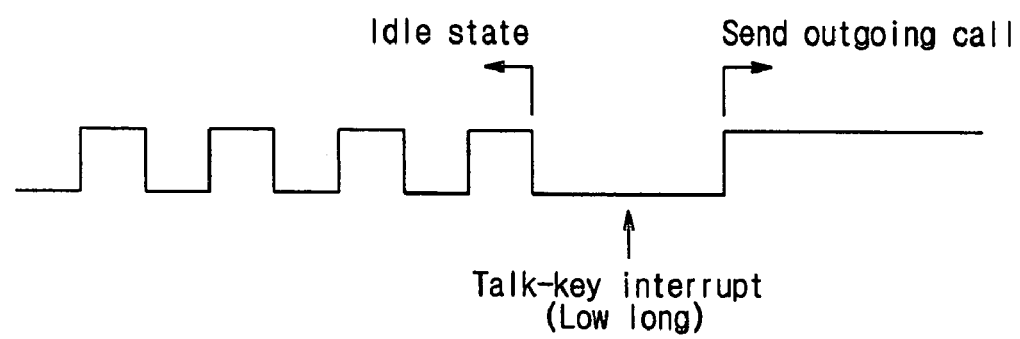

The operations of hands-free signal processing device in a mobile communication terminal is described in detail in the following with reference to FIGS. 3 and 4.

The operations of hands-free signal processing device start from an idle state of a mobile communication terminal (S31). As pulse-type output signal from GPO port of a base-band processor, processed by software, is inputted through a base terminal of a pulse providing transistor (TR1), an AUX_MIC signal from the emitter terminal of the TR1 is converted to a pulse signal (S32). Accordingly, pulse-type AUX_MIC signal is inputted to the base terminal of a signal separating transistor (TR2), so that the TR2 is disabled and the pulse-type hands-free signal (i.e. the pulse-type AUX_MIC signal) is inputted to the base-band processor, referring to FIG. 4(a).

In this moment, the mobile communication terminal checks whether the mobile communication terminal receives an incoming call (S33). When the mobile communication terminal receives an incoming call, the output signal from the GPO port, provided to the base terminal of the TR1, is changed to a high-level signal using software, so that a high-level signal becomes a reference pulse of a hands-free device (S34). Accordingly, the AUX_MIC signal of high-level is inputted to the base terminal of the TR2, so that the TR2 is enabled (S35).

Then, the base-band processor checks whether the talk-key interrupt signal of the hands-free device is detected (S36). Meanwhile, as the talk-key interrupt signal (e.g. high→low, as shown in FIG. 4(b)) is generated by pressing the talk-key of the hands-free device, the talk-key interrupt signal is detected through the base and collector terminals of the TR2. Then, the incoming call is connected according to the talk-key interrupt signal and a user of the mobile communication terminal can talk with the hands-free device (S37).

While the call is connected, the base-band processor keeps checking whether a talk-key interrupt signal of the hands-free device is detected (S38). Meantime, as the user presses the talk-key of the hands-free device to finish the call, the talk-key interrupt signal (e.g. high→low) is generated. When such talk-key interrupt signal is detected through the TR2, the call is disconnected and the mobile communication terminal is shifted to an idle state (S39).

On the other hand, in case that the mobile communication terminal does not receive an incoming call (S33), the base-band processor checks whether the talk-key interrupt signal (e.g. low long) for outgoing call is detected (S40).

As shown in FIG. 3(c), when the talk-key interrupt signal of low-level is generated for a while (at least 1 second) by pressing the talk-key of the hands-free device, the TR2 detects the talk-key interrupt signal. Then, by sending an outgoing call to a communication terminal (e.g. mobile communication terminal), that recently received an outgoing call from the mobile communication terminal of the present invention, according to the talk-key interrupt signal (S41), the outgoing call through the hands-free device is enabled.

The base-band processor changes output signal from the GPO port, connected to the base terminal of the TR1, into high-level signal by using software as the outgoing call is sent, so that high-level signal become a reference pulse of the hands-free device (S42). Accordingly, the AUX_MIC signal of high-level is inputted to the base terminal of the TR2, so that the TR2 is enabled (S43).

Then, the base-band processor keeps checking whether a talk-key interrupt signal of the hands-free device is detected (S38). Meantime, as the user presses the talk-key of the hands-free device to finish the call, the talk-key interrupt signal (e.g. high→low) is generated. When such talk-key interrupt signal is detected through the TR2, the call is disconnected and the mobile communication terminal is shifted to an idle state (S39).

Figure 5:
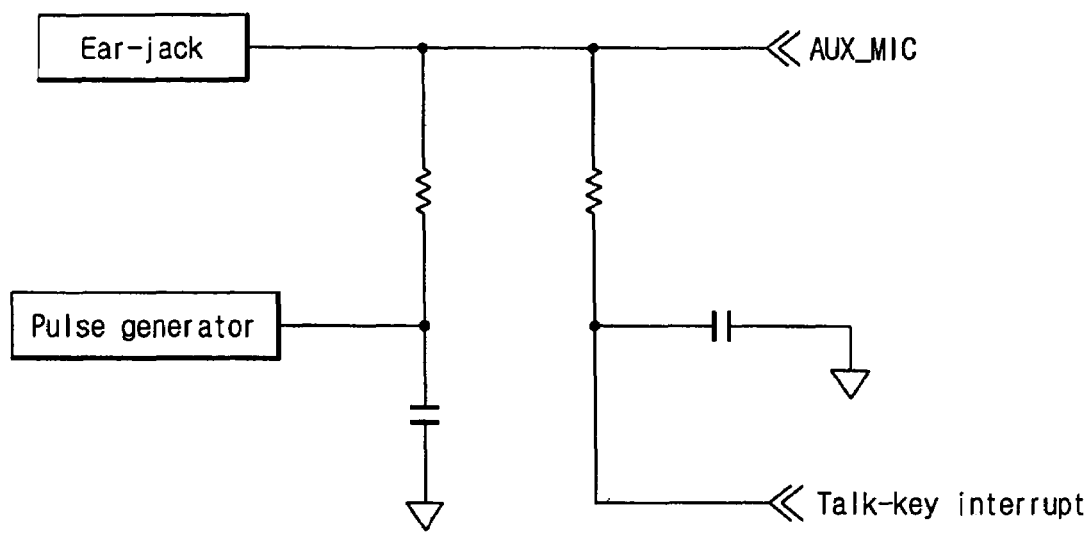
FIG. 5 is a circuit diagram showing a hands-free signal processing device in a mobile communication terminal according to another embodiment of the present invention.

While the present invention has been particularly shown and described with respect to preferred embodiments thereof, it will be understood by ordinary persons skilled in the art that various changes in form and details may be made therein without departing form the spirit and scope of the present invention. For instance, instead of transistors according to the present invention, a reference pulse can be generated, and a MIC signal and a talk-key interrupt signal of a hands-free device can be separated by using resistors and capacitors as shown in FIG. 5. In case of using the resistors and capacitors, a power management unit (PMU) generally adapted to a GSM mobile communication terminal or a pulse generator for programming and generating a pulse and high-level signal should be connected to the GPO port of the base-band processor.

As described above, the present invention can minimize current consumption, caused by a hands-free device, by converting AUX_MIC signal into pulse and using the pulse as a reference pulse of the hands-free device.

And accordingly, since MIC signal and talk-key interrupt signal of a hands-free device are separated by transistors and then processed by a base-band processor, the talk-key interrupt signal of a hands-free device is correctly detected, while incoming/outgoing calls are connected. Thus, the problem in timing can be solved and a proper reaction to a talk-key interrupt signal of a hands-free device can be achieved.

What is claimed is:

1. A hands-free signal processing device in a mobile communication terminal comprising:

a signal separating transistor, connected to a microphone (MIC) terminal of an ear-jack provided in a hands-free device and a base-band processor for processing a talk-key interrupt signal of the hands-free device, for separating a MIC signal and the talk-key interrupt signal; and a pulse providing transistor, connected to the MIC terminal of the ear-jack and general purpose output (GPO) port of the base-band processor, for providing the signal separating transistor with the MIC signal varying according to output signal from the GPO port, wherein the base-band processor disables the signal separating transistor by outputting the software-processed pulse through the GPO port and providing the base terminal of the signal separating transistor with the pulse through the pulse providing transistor, when the mobile communication terminal is in an idle state.

2. A hands-free signal processing device in a mobile communication terminal comprising:

a signal separating transistor, connected to a microphone (MIC) terminal of an ear-jack provided in a hands-free device and a base-band processor for processing a talk-key interrupt signal of the hands-free device, for separating a MIC signal and the talk-key interrupt signal; and a pulse providing transistor, connected to the MIC terminal of the ear-jack and general purpose output (GPO) port of the base-band processor, for providing the signal separating transistor with the MIC signal varying according to output signal from the GPO port, wherein the base-band processor enables the signal separating transistor by changing output pulse from the GPO port to a high-level signal using software and using the high-level signal as reference pulse of the hands-free device, while outgoing/incoming calls are connected.

3. A hands-free signal processing device in a mobile communication terminal comprising:

a signal separating transistor, connected to a microphone (MIC) terminal of an ear-jack provided in a hands-free device and a base-band processor for processing a talk-key interrupt signal of the hands-free device, for separating a MIC signal and the talk-key interrupt signal; and a pulse providing transistor, connected to the MIC terminal of the ear-jack and general purpose output (GPO) port of the base-band processor, for providing the signal separating transistor with the MIC signal varying according to output signal from the GPO port, wherein the pulse providing transistor is an NPN transistor with an emitter terminal tied to ground, an emitter terminal of the pulse providing transistor being connected to the MIC terminal of the ear-jack, a base terminal of the pulse providing transistor being connected to the GPO port of the base-band processor, and wherein the base-band processor disables the signal separating transistor by outputting the software-processed pulse through the GPO port and providing the base terminal of the signal separating transistor with the pulse through the pulse providing transistor, when the mobile communication terminal is in an idle state.

4. A hands-free signal processing device in a mobile communication terminal comprising:

a signal separating transistor, connected to a microphone (MIC) terminal of an ear-jack provided in a hands-free device and a base-band processor for processing a talk-key interrupt signal of the hands-free device, for separating a MIC signal and the talk-key interrupt signal; and a pulse providing transistor, connected to the MIC terminal of the ear-jack and general purpose output (GPO) port of the base-band processor, for providing the signal separating transistor with the MIC signal varying according to output signal from the GPO port, wherein the pulse providing transistor is an NPN transistor with an emitter terminal tied to ground, an emitter terminal of the pulse providing transistor being connected to the MIC terminal of the ear-jack, a base terminal of the pulse providing transistor being connected to the GPO port of the base-band processor, and wherein the base-band processor enables the signal separating transistor by changing output pulse from the GPO port to a high-level signal using software and using the high-level signal as reference pulse of the hands-free device, while outgoing/incoming calls are connected.

* * * * *